United States Patent

Makino

[11] Patent Number: 5,452,439
[45] Date of Patent: Sep. 19, 1995

[54] KEYBOARD TUTORING SYSTEM

[75] Inventor: Yoshimi Makino, Yokohama, Japan

[73] Assignee: Matsushita Electric Industrial Co., Ltd., Osaka, Japan

[21] Appl. No.: 970,050

[22] Filed: Nov. 2, 1992

[30] Foreign Application Priority Data

Nov. 14, 1991 [JP] Japan .................. 3-298723

[51] Int. Cl.⁶ .......................... G06F 15/40; G06F 7/20
[52] U.S. Cl. ................................ 395/155; 395/185.1; 395/2.75; 341/23; 345/170
[58] Field of Search ........................ 395/575, 155, 161; 340/425, 815; 371/16.1, 16.5, 29.1, 29.5, 66; 364/141, 153, 159, 183, 481; 361/94, 95, 96, 97

[56] References Cited

U.S. PATENT DOCUMENTS

| | | | |
|---|---|---|---|
| 3,633,180 | 1/1972 | Pabst | 340/172.5 |
| 3,932,709 | 1/1976 | Hoff | 179/90 |
| 4,037,200 | 7/1977 | Cranmer | 340/166 |
| 4,251,688 | 2/1981 | Furner | 179/1 |
| 4,321,672 | 3/1982 | Braun | 364/408 |
| 4,412,210 | 10/1983 | Washizuka | 340/365 |
| 4,500,964 | 2/1985 | Nickle | 364/300 |
| 4,654,482 | 3/1987 | DeAngelis | 379/95 |
| 4,659,088 | 4/1987 | Lee | 273/310 |
| 4,739,205 | 4/1988 | Fuhrman | 370/85 |
| 4,837,552 | 6/1989 | Vandemotter | 340/461 |
| 4,964,077 | 10/1990 | Eisen | 364/900 |
| 4,964,124 | 10/1990 | Burnett | 371/15.1 |
| 5,012,406 | 4/1991 | Martin | 364/200 |
| 5,255,386 | 10/1993 | Prager | 395/600 |

FOREIGN PATENT DOCUMENTS

| | | | |
|---|---|---|---|
| 57-34271 | 2/1982 | Japan | 235/379 |
| 5932058 | 8/1982 | Japan | 235/379 |
| 58-169289 | 10/1983 | Japan | 235/379 |
| 60-263256 | 6/1984 | Japan | 235/379 |
| 60-10387 | 1/1985 | Japan | 235/379 |

OTHER PUBLICATIONS

Text Search Examiner Training Manual for the Automated Patent System (APS), Jun. 15, 1990.
Automated Patent System (APS), Text Search Examiner Training Manual. Jun. 15, 1990.

Primary Examiner—Robert W. Beausoliel, Jr.
Assistant Examiner—Ly V. Hua
Attorney, Agent, or Firm—Stevens, Davis, Miller & Mosher

[57] ABSTRACT

An operation guide system is disclosed which is able to inform an operator only of input operations presently available for a computer, a word processor or the like, and guides operation automatically in case of invalid operation. When an operator taps one of the keys arranged on a keyboard, a key signal is sent out to a key comparison section. The key comparison section determines whether the input key signal is from a key assigned to an available operation in a current operation state or not by referring to information in a key table storing unit. When it is determined that the key signal is not from a presently valid key, it is determined whether a condition for outputting the guide is satisfied or not with reference to a guide condition setting section. If the condition is satisfied, an instruction is given to an operation guide output section to output the operation guide. Further, if the condition is not satisfied, another key signal is awaited. The operation guide output section which receives the instruction outputs the operation guide.

6 Claims, 3 Drawing Sheets

FIG. 1
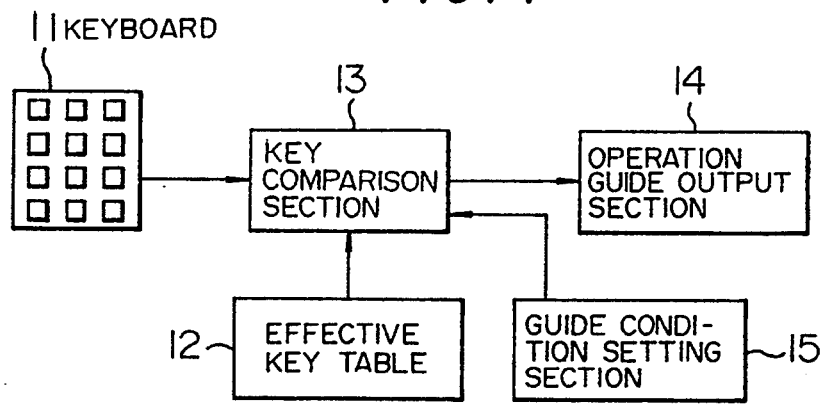
FIG. 2
PRESS A DESIRED KEY AFTER CONSULTING THE EXPLANATION
FOR REGISTRATION OF SECRET CODE
| REGISTRATION OF SECRET CODES | |
|---|---|
| KEY | FUNCTION OF KEY |
| [REGISTRATION] ⇨ | REGISTERS A NEW SECRET CODE |
| [CONFIRMATION] ⇨ | CONFIRMS REGISTERED SECRET CODE |
| [ALTERATION] ⇨ | CHANGES REGISTERED SECRET CODE |
| [END] ⇨ | CLOSES EXPLANATION SHEET FOR SECRET CODE |
FIG. 3
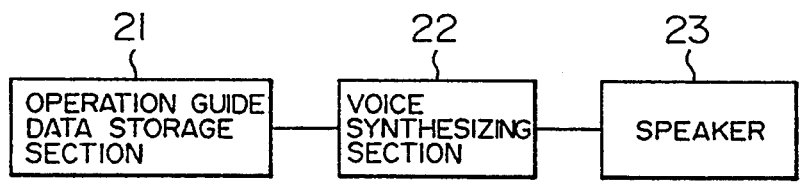

FIG. 5

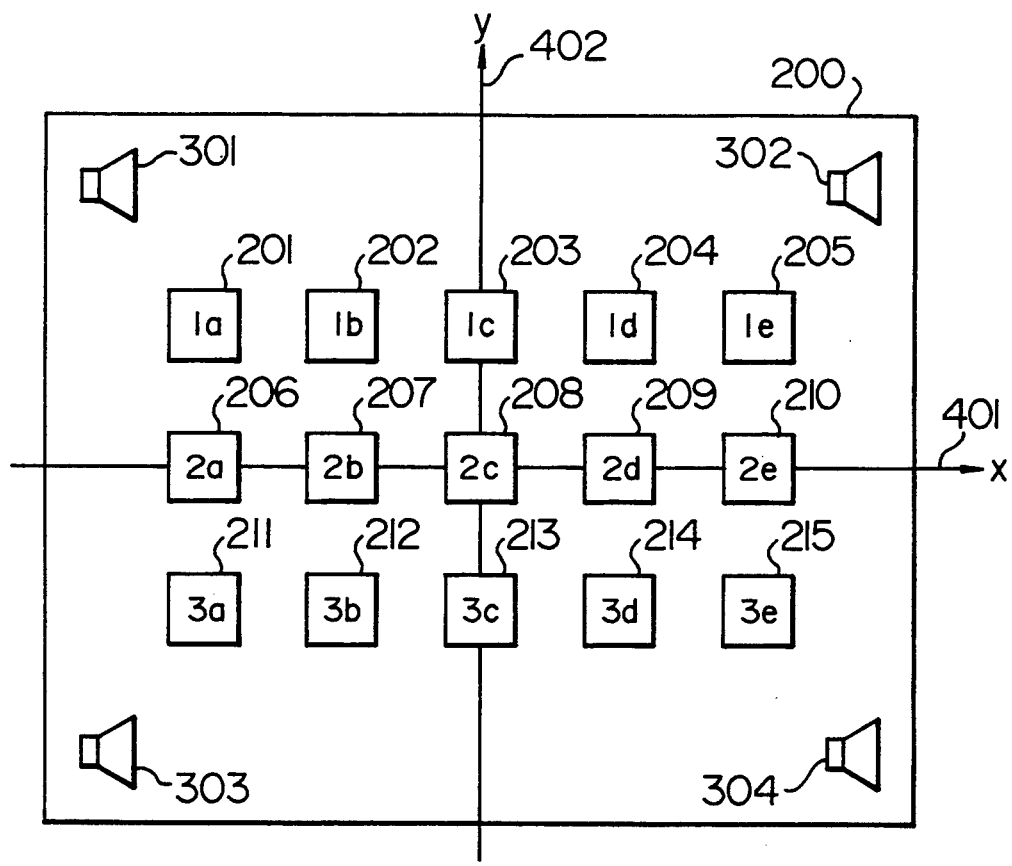

FIG. 6

SET CONDITION FOR OUTPUTTING OPERATION GUIDE FOR RESPECTIVE SCREENS WHEN MISOPERATION OF A KEY OCCURS.
IF NO NUMBER IS SET, THE PRESET NUMBER WILL BE SET.

| SETTING OF OPERATION GUIDE CONDITION |
|---|

[SCREEN NUMBER 1] : INDICATE AFTER __ TIMES OF KEY ERRORS
(PRESET AT ONE TIME)

[SCREEN NUMBER 2] : INDICATE AFTER __ TIMES OF KEY ERRORS
(PRESET AT TWO TIMES)

[SCREEN NUMBER 3] : INDICATE AFTER __ TIMES OF KEY ERRORS
(PRESET AT TWO TIMES)

[SCREEN NUMBER 4] : INDICATE AFTER __ TIMES OF KEY ERRORS
(PRESET AT TWO TIMES)

KEYBOARD TUTORING SYSTEM

BACKGROUND OF THE INVENTION

Field of the Invention

The present invention relates to an operation guide system which is utilized in a computer, a word processor or the like and which outputs a helpful operation guide for an operator when the operator makes an incorrect manual operation and thus prevents the functioning of the device from proceeding.

When an operator performs a required input operation from a keyboard on which a plurality of keys are arranged for inputting information to control a computer, a word processor or the like, it is difficult to avoid making erroneous key entries altogether. For example, it is impossible to guarantee that an operator will always hit a key corresponding to a presently available operation because of insufficient understanding of correct operation by the operator, mis-operation by the operator, deficiency of man-machine interface design in the equipment being used, and so on. Therefore, a help function which displays an operation guide on a screen in accordance with a request by the operator and an operation manual have been heretofore prepared in order to help the operator to easily continue hitting the correct keys, or in other words, to continue correct input operations.

With the display of the operation guide on the screen by the help function of the prior art, however, it cannot be expected that the operation guide provided will be sufficient. Namely, since the display guide is normally in the form of a simple list without sufficient explanation, the operator cannot easily understand the operations. Therefore, the operator may find it difficult to continue prompt operations. Further, there is a drawback in that, while the information is insufficient for those operators who need a full explanation, the guide is troublesome for those skilled operators who need no explanation. Furthermore, since a certain operation is required to call a help function, there is also a drawback in that a necessary operation guide cannot be displayed on the screen when the operator does not know how to utilize the help function.

Further, when the operator consults the operation manual, an inconvenience arises in that the manual, which is a separate item from the apparatus, is to be referred to on all such occasions, and prompt operation cannot be continued because the operator has to locate the required guide items in a vast volume of descriptions.

SUMMARY OF THE INVENTION

It is an object of the present invention to provide an improved operation guide system used in a control unit such as a computer which can provide the operator with a guide relevant only to a present input operation and to automatically provide a suitable operation guide when the operator performs an invalid operation.

It is another object of the invention to provide an operation guide system which reduces excessive movement of the operator's eyes by displaying the guides on a screen.

It is a further object of the invention to provide an operation guide system which promptly indicates the valid keys to the operator through a voice message.

It is a still further object of the invention to provide an operation guide system which generates a visual guide or an audible guide for easy recognition of the appropriate key operations.

In order to achieve the above-described objects, an operation guide system of the present invention is provided with a keyboard on which a plurality of keys are arranged, key table storing means for storing information indicating which of the plurality of keys are assigned to available operations in each of the plurality of operation states, key comparison means for comparing a key of the keyboard which is actuated by the operator with the keys stored in the key table storing means, and operation guide output means for outputting an operation guide for the keys which are assigned to available operations in the present operation state when the key comparison means decides that the key of the keyboard which is actuated by the operator is not included in the list of keys.

Furthermore, the operation guide output means may display the guides for key operation on a screen.

Further, the operation guide output means may output the guides for key operation in a voice message.

Furthermore, the operation guide output means may indicate the keys of the keyboard which are assigned to available operations with a different brightness from other portions of the keyboard.

Further, the operation guide output means may generate a sound field for producing a sound from the key position of the keyboard.

Furthermore, the operation guide system of the present invention may include output condition confirming means for setting operation start conditions for the operation guide output means in advance.

Thus, the operation guide system of the present invention indicates only the keys assigned to available operations in the present operation state. Therefore, the system can inform the operator of valid input operations and automatically output a suitable operation guide in case of an invalid operation.

According to the system of the present invention which displays valid keys and operation guides on a screen, the operator's eyes may move in a rather small area, thus decreasing fatigue.

Alternatively, according to the system of the present invention which outputs operation guides in a voice message, the explanation given can be understood promptly.

Furthermore, keys indicated according to the operation guide can be made to have a brightness different from that of other portions. For example, according to the system of the present invention in which only keys assigned to available operations are illuminated from the inside, these keys can be visually identified easily.

Further, according to the system of the present invention which outputs an operation guide by the use of sound, the operator can easily hear where the valid key is located. The operation guide system with a combination of a plurality of these operation guide means may have more than one of the above mentioned merits.

Furthermore, the operation start conditions of indication of the operation guides, such as a delay time from the occurrence of an incorrect operation to the output of the operation guide or the number of incorrect operations after which the operation guide is output, may be set in advance. Thus, the system of the invention may obtain an optimization of guide conditions.

BRIEF DESCRIPTION OF THE DRAWINGS

FIG. 1 is a block diagram showing a structure of a first embodiment of control unit of the present invention;

FIG. 2 is a diagram showing a displayed screen in the operation guide output section of a second embodiment;

FIG. 3 is a block diagram showing a structure of a third embodiment in a case in which the operation guide output section outputs a voice message;

FIG. 5 is a block diagram showing a structure of an operation guide output section and a keyboard section of a fifth embodiment; and FIG. 6 is an explanatory view showing a set screen of a guide condition setting section of a sixth embodiment.

DESCRIPTION OF THE PREFERRED EMBODIMENTS

Figure 4:
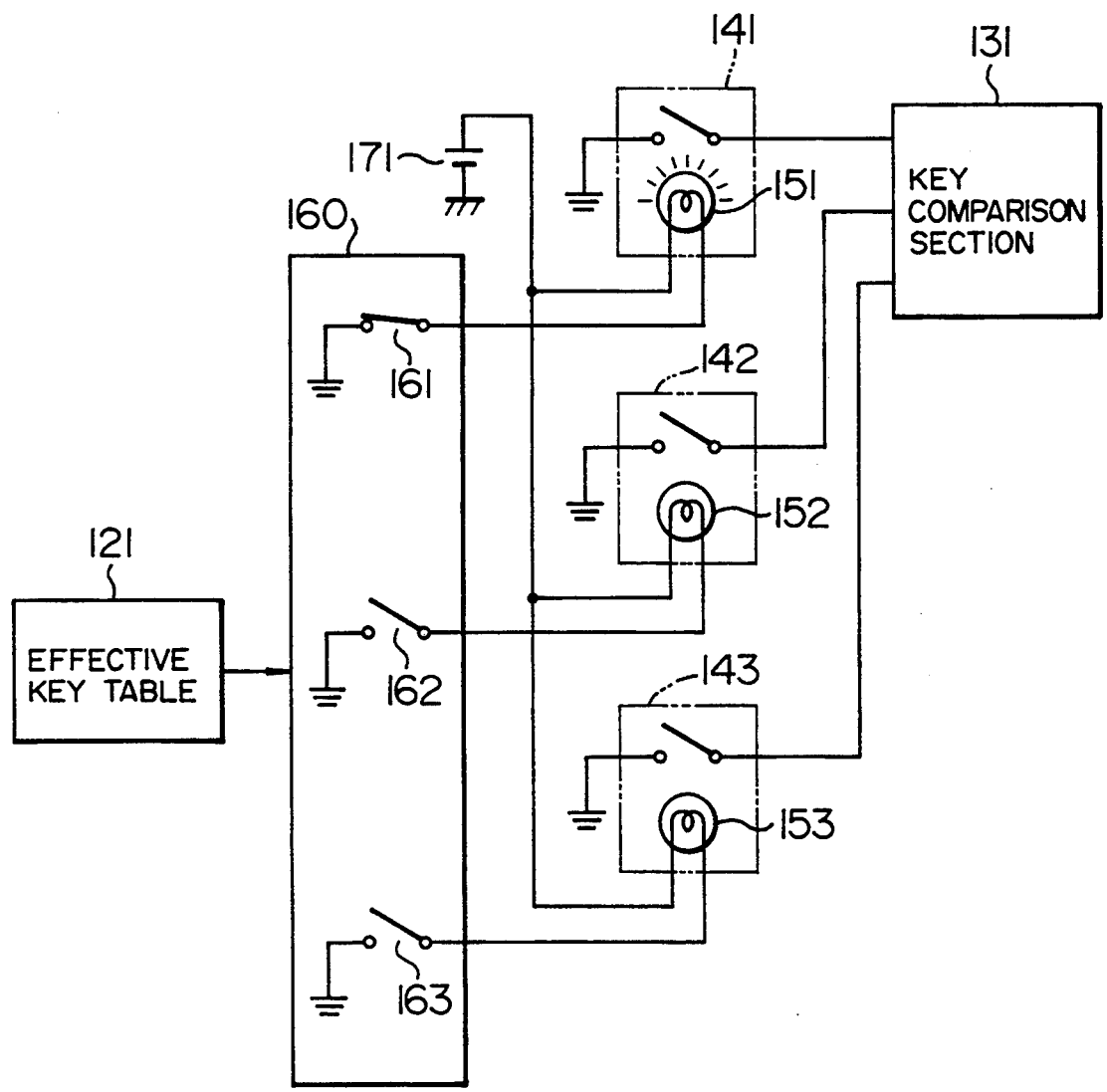
FIG. 4 is a connection diagram showing a structure of an operation guide output section and a keyboard section of a fourth embodiment.

Embodiments of an operation guide system of the present invention will be described hereinafter with reference to the drawings.

FIG. 1 shows a structure of a first embodiment. In FIG. 1, reference numeral 11 represents a keyboard on which a plurality of keys are arranged, and 12 represents key table storing means for storing information indicating which of the plurality of keys are assigned to available operations in each of a plurality of operation states. Reference numeral 13 represents a key comparison section for comparing key information obtained from keyboard 11 with effective key information stored in key table storing means 12, 14 represents an operation guide output section for outputting the operation guide on the basis of an instruction from the key comparison section 13, and 15 represents a guide condition setting section for setting and holding conditions for outputting from the operation guide output section 14.

The operation in the structure of the first embodiment will be described.

When an operator taps one key from among the plurality of keys arranged on keyboard 11, the key signal is sent out to key comparison section 13.

Key comparison section 13 determines whether or not the input key signal is from a key assigned to an available operation in the present operation state by referring to the key information supplied from key table storing means 12.

When key comparison section 13 determines that the input key signal is not from a key assigned to an available operation, operation guide output section 14 outputs an operation guide. When guide condition setting section 15 is provided, it functions as follows. When key comparison section 13 determines that the input key signal is not from a key assigned to an available operation, it is determined whether a condition for outputting the guide is satisfied or not by referring to the conditions stored in guide condition setting section 15. Guide condition setting section 15 stores a condition such as the number of times an invalid key is actuated or the time elapsed after actuation of an invalid key in a certain operation state before the guide is output. If the condition is satisfied, operation guide output section 14 is controlled to output the operation guide. If the condition is not satisfied, a further key actuation is awaited. Operation guide output section 14 outputs the operation guide when it receives an instruction to do so.

A second embodiment will now be described. FIG. 2 shows an example of a display screen in an image display unit (not illustrated) which is provided in operation guide output section 14. The display screen displays the guide for performing such operations as, for instance, registration, confirmation and alteration of personal secret codes. Then, when the key assigned to registration is actuated, the only usable input is from digit keys for entry of secret codes, and function keys and alphabetical keys become invalid. A user uses keyboard 11 to perform the operation corresponding to information displayed on the screen. That is, information exchange is made through the display on the screen. This mode of operation is called a display interactive mode.

Next, the operation in the second embodiment will be described.

When an operator actuates one key from among a plurality of keys of keyboard 11, the key signal is input into key comparison section 13. Key comparison section 13 determines whether the input key signal is from a key assigned to an available operation in the present operation state by referring to information included in key table storing means 12.

When the key signal is determined to be from a key assigned to an available operation in the present operation state, information corresponding to that key is displayed on a screen. The operator can perform a succeeding operation from keyboard 11 in accordance with information displayed on the screen.

Further, when it is determined that the key signal obtained by actuating the key from the keyboard is not from any key assigned to a valid operation in the present operation state, the display on the screen which has been utilized for information exchange with the operator is switched to inform the user that an invalid key has been actuated, and an operation guide for indicating and explaining the keys assigned to available operations is displayed on the screen.

A third embodiment will now be described. FIG. 3 shows a structure included in the operation guide output section in a case in which operation guide output section 14 outputs a voice message. In FIG. 3, numeral 21 represents an operation guide data storage section in which operation guide data are stored, 22 represents a voice synthesizing section for converting the data in the operation guide data storage section 21 into a voice message, and 23 represents a speaker which outputs a voice signal from the voice synthesizing section 22 as a voice message.

Next, the operation of the third embodiment will be described with respect to a case when guide condition setting section 15 is provided.

When it is determined that the key information obtained by key actuation at keyboard 11 is not from any key assigned to a valid operation in the present operation state, key comparison section 13 refers to the condition which is set in guide condition setting section 15 and determines whether the condition for outputting the guide is satisfied or not.

Then, when the condition is satisfied, operation guide output section 14 is supplied with an instruction to output the operation guide. Operation guide output section 14, receiving the instruction to output the operation guide, retrieves the necessary operation guide data from operation guide data storage section 21 installed in the system and feeds the data to voice synthesizing section 22. Voice conversion is performed in this voice synthesizing section 22, and the operation guide is outputted in a voice message through speaker 23.

Also, in the third embodiment, the data from operation guide data storage section 21 are converted into a voice message by voice synthesizing section 22, but alternatively, it may also be arranged so that the operation guide is recorded in advance directly with a voice signal and the voice is output similarly to the above case but without synthesis.

A fourth embodiment will now be described.

FIG. 4 shows a structure of a portion of operation guide output section 14 and keyboard 11 of the fourth embodiment. In FIG. 4, numeral 121 represents key table storing means, which corresponds to key table storing means 12 shown in FIG. 1. Numeral 131 represents a key comparison section, which corresponds to key comparison section 13 in FIG. 1. Numerals 141, 142 and 143 represent keys on keyboard 11 shown in FIG. 1. The tops of the keys are formed of a translucent or transparent material which transmits light from an inside source outward. Numerals 151, 152 and 153 represent lamps contained inside keys 141 to 143, respectively. Numeral 160 represents a key lighting control section, 161, 162 and 163 represent lamp lighting contacts, and 171 represents a lamp power source.

Next, the operation of the fourth embodiment will be described.

When it is determined that key information provided by actuating the keys of keyboard 11 is not derived from keys which are assigned to available operations in the present operation state as the result of comparison with the information in key table storing means 121, key comparison section 131 determines whether the situation satisfies the conditions for outputting the guide stored in guide condition setting section 15 and instructs operation guide output section 14 to output the operation guide if the conditions are satisfied. Operation guide output section 14 receives the instruction to output the operation guide and provides key lighting control section 160 installed in the system with information on the keys assigned to available operations, this information being derived from key table storing means 121, and key lighting control section 160 closes the contacts corresponding to the valid keys from among lamp lighting contacts 161 to 163 in control section 160 so as to light the lamps of the keys which are valid for the present operation.

Here, in case key 141 is one of the keys assigned to available operations, for instance, lamp lighting contact 161 is closed to turn lamp 151 ON. When the contact turns ON, a current circuit is formed from lamp power source 171, through lamp 151 contained in key 141 and lamp lighting contact 161, and further connected to the ground, and thus lamp 151 contained in the key is lighted. Since lamp 151 is contained in key 141 composed of a translucent material, key 141 is indicated with a light distinctly from other keys 142 and 143.

A fifth embodiment will now be described.

FIG. 5 shows a part of the structure of operation guide output section 14 and keyboard 11 of the fifth embodiment. In FIG. 5, numeral 200 represents a keyboard, which corresponds to keyboard 11 shown in FIG. 1. Numerals 201 to 215 represent keys included in keyboard 200, in which fifteen keys are arranged in three rows by five columns. The keys are named with a code comprising a numeral as a prefix and a letter of the alphabet as a suffix for the sake of convenience. Numerals 1, 2 and 3 represent the first row, the second row and the third row from top to bottom, respectively. Furthermore, respective alphabetical characters a, b, c, d and e are affixed in order to distinguish the columns from left to right.

Numeral 401 represents an x-coordinate axis, and 402 represents a y-coordinate axis. Key 208 named 2c is located at the origin of the coordinates, the x-coordinate axis 401 extends from left to right, and the y-coordinate axis 402 extends from bottom to top.

Further, 301, 302, 303 and 304 represent speakers for producing a sound field for the operation guide. The speakers are comprised in operation guide output section 14 and arranged at four corners of the keyboard 200, and each of them has a sound volume which can be controlled independently.

In the present embodiment, 15 keys 201 to 215 and four speakers 301 to 304 are arranged vertically and horizontally in line symmetry with respect to x-coordinate axis 401 and y-coordinate axis 402 for the sake of simplification of the acoustic condition.

Next, the operation of the fifth embodiment will be described.

When it is determined that the key signal provided by actuating a key on keyboard 11 is not derived from any of the keys assigned to valid operations in the present operation state, key comparison section 13 determines whether the conditions for outputting the guide are satisfied or not by referring to the conditions stored in guide condition setting section 15, and, if the conditions are satisfied, instructs operation guide output section 14 to output the operation guide. Operation guide output section 14 receives the instruction to output the operation guide and actuates speakers 301 to 304. Since all fifteen keys 201 to 215 and four speakers 301 to 304 are arranged vertically and horizontally in line symmetry with respect to the x-coordinate axis 401 and the y-coordinate axis 402, a sound field produces a sound to be heard from the position of key 208 affixed with code 2c when the sound volumes of the four speakers are made equal to each other. Further, as the composite sound volume composed of the sounds from two speakers 302 and 304 arranged on the right side increases relative to the composite sound volume of two speakers 301 and 303 arranged on the left, the sound field moves rightward in the positive direction of the x-coordinate axis 401. When the sound volume of each of two speakers 302 and 304 arranged on the right is made equal and the sound volume of two speakers 301 and 303 arranged on the left is made zero, the sound field is located at a point on the x-coordinate axis 401 and on a line connecting the speaker 302 and the speaker 304. Referring to FIG. 5, this point is located at a position slightly on the right side of key 210 designated 2e. In case the relative sound volumes are reversed with respect to left and right, the sound field moves in a negative direction on x-coordinate axis 401.

The same holds for the y-coordinate axis 402. As the composite sound volume of two speakers 301 and 302 arranged at the top increases relative to the composite sound volume of two speakers 303 and 304 arranged at the bottom, the sound field moves by a larger distance in a positive direction of the y-coordinate axis 402. When the relative sound volumes are reversed vertically, the sound field moves reversely in a negative direction of the y-coordinate axis 402. By adopting the principle of sound field movement as described above, it is possible to set the sound field indicative of the position of any of fifteen keys 201 to 215.

In the present embodiment, it has been assumed that all of the fifteen keys 201 to 215 and four speakers 301 to 304 are arranged in vertical and horizontal directions in line symmetry with respect to the x-coordinate axis 401 and the y-coordinate axis 402, but it is possible to easily set the sound field at any optional key position as long as the key to be indicated is located within the quadrangle having corners at the four speakers. Alternatively, it is also possible to incorporate a small-sized speaker in every key in place of the lamps 151 to 153 shown in FIG. 4 for generating a sound when a key is selected.

A sixth embodiment will now be described.

FIG. 6 shows an example of a set screen displayed by guide condition setting section 15.

Here, it is assumed that the setting is made through an image display unit by information exchange with an operator, or in other words, that a dialogue system is in use. In FIG. 6, the set screen shows four image screens for information exchange in all, and advises the operator to set the number of key operation errors until the operation guide is output for each of these image screens. If nothing is set, preset values indicated on the screen are entered.

Next, the operation of the sixth embodiment will be described.

In FIG. 6, it is assumed that no new numbers have been set, i.e., all are set to the preset value. When the control unit is operated using the preset value, the operation guide shown in screen number 1 is output at the first incorrect key actuation. However, this setting is troublesome in case too many incorrect actuations occur. Further, in screen number 2, the operation guide is not output unless two incorrect actuations occur; however, it is assumed that this screen number 2 should be displayed promptly because the operation corresponding to this screen is so complicated that many mistakes occur. In such a case, the set value for screen number 1 in the screen shown in FIG. 6 is increased from the preset value to two, and the set value for screen number 2 is set to one by reducing it from the preset value. After those set values are changed, the time of outputting the operation guide after the mis-operation is altered.

As is apparent from the above description, the control unit of the present invention functions to give the operator the information concerning only those keys which are assigned to available operations and to automatically give an operation guide only when an invalid operation is performed, because the control unit provides guidance only for key operation appropriate to the present operation state.

In this case, since the guide to correct operation is displayed on the screen in case of incorrect operation, movement of the operator's eyes may be reduced, thus decreasing fatigue.

Further, since the operation guide may be output in a voice message, the explanation thereof can be understood promptly.

Furthermore, the keys assigned to available operations may be visually identified easily since these keys are illuminated with a brightness different from that of other portions, e.g., only these keys are illuminated from the inside thereof.

Further, the operation guide can give a sound signal from which it can be easily ascertained where the valid key is located.

Further, optimization of the guide condition can be aimed at because the indication start time of the operation guide can be set in advance, i.e., any condition such as the time required from an invalid operation to indication of the guide.

Further, a valid key display mode may be provided, and, when this mode is designated, it is possible to display valid keys corresponding to the operation state at that time prior to operation.

I claim:

1. An operation guide system for a device having a plurality of operation states, said operation guide system comprising:

a keyboard having a plurality of keys arranged thereon;

key table storing means for storing information indicating which of said plurality of keys are assigned to available operations in each of said plurality of operation states;

key comparison means for determining which of said plurality of operation states is a present operation state, extracting a list of keys which are assigned to available operations in the present operation state from said key table storing means, and determining whether a key which is actuated by an operator of said device is included in said list of keys; and operation guide output means for outputting an operation guide for the list of keys when said key comparison means determines that the key which is actuated by the operator of the device is not included in said list of keys, wherein the keyboard comprises means for illuminating the plurality of keys in varying brightness levels, and wherein the operation guide output means comprises means for controlling the keyboard to illuminate those of said plurality of keys which are on the list of keys in a first brightness level and to illuminate those of said plurality of keys which are not on the list of keys in a second brightness level which is different from said first brightness level.

2. An operation guide system for a device having a plurality of operation states, said operation guide system comprising:

a keyboard having a plurality of keys arranged thereon;

key table storing means for storing information indicating which of said plurality of keys are assigned to available operations in each of said plurality of operation states;

key comparison means for determining which of said plurality of operation states is a present operation state, extracting a list of keys which are assigned to available operations in the present operation state from said key table storing means, and determining whether a key which is actuated by an operator of said device is included in said list of keys; and operation guide output means for outputting an operation guide for the list of keys when said key comparison means determines that the key which is actuated by the operator of the device is not included in said list of keys, wherein the operation guide output means has a plurality of speakers and indicates at least one of said plurality of keys which are on said list of keys by producing a sound field for generating a sound from a position of the keyboard corresponding to said at least one of said plurality of keys.

3. An operation guide system according to claim 2, wherein said plurality of speakers are located on said keyboard at four corners of a quadrilateral which encloses said plurality of keys, and wherein said operation guide output means further comprises means for varying sound volumes produced by said plurality of speakers to control a position of the keyboard from which the sound is generated.

4. An operation guide system for a device having a plurality of operation states, said operation guide system comprising:

a keyboard having a plurality of keys arranged thereon;

key table storing means for storing information indicating which of said plurality of keys are assigned to available operations in each of said plurality of operation states;

key comparison means for determining which of said plurality of operation states is a present operation state, extracting a list of keys which are assigned to available operations in the present operation state from said key table storing means, and determining whether a key which is actuated by an operator of said device is included in said list of keys;

operation guide output means for outputting an operation guide for the list of keys when said key comparison means determines that the key which is actuated by the operator of the device is not included in said list of keys; and guide condition setting means for setting an operation start time of the operation guide output means in advance of a use of said device by said operator.

5. An operation guide system according to claim 4, wherein said guide condition setting means sets said operation start time as a number of actuations of keys which are not on said list of keys.

6. An operation guide system according to claim 4, wherein said guide condition setting means comprises means for receiving an operator input of said operation start time and for setting, when said operator input is not received, said operation start time in accordance with a predetermined default operation start time.

* * * * *